US006655435B2

(12) United States Patent
Penati et al.

(10) Patent No.: US 6,655,435 B2
(45) Date of Patent: Dec. 2, 2003

(54) SYSTEM FOR CREATING LINERLESS PRESSURE SENSITIVE COIL OF STAMPS

(75) Inventors: Anthony A. Penati, Killingworth, CT (US); Richard J. Brining, Old Lyme, CT (US); Peter Moore, Clinton, CT (US); William G. Gunther, Guilford, CT (US)

(73) Assignee: George Schmitt & Company, Inc., Branford, CT (US)

( * ) Notice: Subject to any disclaimer, the term of this patent is extended or adjusted under 35 U.S.C. 154(b) by 0 days.

(21) Appl. No.: 10/032,961

(22) Filed: Oct. 24, 2001

(65) Prior Publication Data

US 2002/0056515 A1 May 16, 2002

Related U.S. Application Data

(60) Provisional application No. 60/243,155, filed on Oct. 25, 2000.

(51) Int. Cl.[7] ................................................ B23B 31/00

(52) U.S. Cl. ........................ 156/513; 156/522; 156/537

(58) Field of Search .......................... 156/80, 184, 193, 156/250, 252, 253, 425, 426, 429, 498, 510, 513, 537, 522

(56) References Cited

U.S. PATENT DOCUMENTS 3,558,070 A * 1/1971 Gabriels .................. 242/523.1
3,756,527 A * 9/1973 Collins et al. ........... 242/525.3
4,132,582 A * 1/1979 Winkler ...................... 156/209
4,145,236 A * 3/1979 Neumayer et al. ......... 156/73.1
4,410,383 A * 10/1983 Lipari ....................... 156/73.1
5,483,811 A * 1/1996 Miller ......................... 72/197
5,580,012 A * 12/1996 Soltysiak .................... 242/528
6,203,067 B1 * 3/2001 Shipston et al. .............. 283/71

* cited by examiner

*Primary Examiner*—Curtis Mayes
*Assistant Examiner*—Sing Po Chan
(74) *Attorney, Agent, or Firm*—St.Onge Steward Johnston & Reens LLC

(57) ABSTRACT

A system for creating a coil of stamps from a web of stamp material having an adhesive applied to a side thereof is provided. The system includes an anvil and a perforation die cooperating therewith with the web passing therebetween in order to perforate the web. The web is passed between the anvil and the die with the adhesive side thereof facing the anvil. The anvil is chilled so as to inhibit the adhesive from adhering thereto as the web is perforated. The anvil may be chilled from an outer surface thereof, or may be hollow and chilled from an inner surface thereof. In the former case, the system preferably includes a trough holding a chilling material through which at least a portion of the outer surface of the anvil is passed. Where the anvil is chilled from an inner surface thereof, a cooling fluid is preferably passed therethrough.

33 Claims, 3 Drawing Sheets

SYSTEM FOR CREATING LINERLESS PRESSURE SENSITIVE COIL OF STAMPS

RELATED APPLICATIONS

This patent application claims the benefit, under Title 35, United States Code, §119(e), of U.S. Provisional Patent Application No. 60/243,155, filed Oct. 25, 2000.

FIELD OF THE INVENTION

The present invention relates to a system for producing pressure sensitive stamps, and more particularly to a method which allows for the production of a coil of such pressure sensitive stamps without a backing or liner on the entire coil.

BACKGROUND OF THE INVENTION

It has long been known to roll a strip of stamps into a coil to save space and to provide a convenient mechanism for detaching one or more stamps from a plurality of others. However, such a coil configuration had been limited to traditionally known stamps which required moistening on a glue side before being adhered to an envelope.

More recently, so-called "self adhesive" stamps have been becoming more and more popular. These stamps do not have to be moistened, but rather are provided with a pressure sensitive adhesive layer which is adhered to the envelope. The pressure sensitive adhesive layer is typically covered with a protective backing, or liner, consisting of a strip of non-adhesive material, generally of the same width of or wider than the strip of stamps, which is peeled away before the stamp is adhered to the envelope in order to expose the adhesive layer.

It has been proposed to roll such self-adhesive stamps into a coil in order to enjoy the convenience and space-saving characteristics associated therewith. However, when using known pressure sensitive adhesive stamp designs, rolling them into a coil requires that the entire coil of stamps have a strip of protective liner backing the adhesive layer. This liner is required in order to prevent the adhesive layer from adhering to the printed, unprotected face of the stamp material which is wound immediately beneath the liner which provides a protective barrier. Providing a strip of liner for the entire coil of stamps, however, is undesirable for several reasons. One such reason relates to environmental concerns. The liner strip comprises unnecessary waste, which adversely impacts the environment. Moreover, the liner increases the material costs associated with manufacturing the stamps. Furthermore, when a liner is used, one is required to unroll a stamp off the coil, remove the stamp from the liner, and detach it from the next following stamp before adhering the stamp to the envelope. It would be easier for the user if the stamp could simply be unrolled, detached from the following stamp, and adhered to the envelope without having to remove a liner.

In order to remedy the above concerns, and referring to FIG. 1, a coil 10 of stamps has been developed. Coil 10 comprises a continuous strip 12 of stamps rolled on itself, similar to a roll of tape. It should be noted that the strip 12 of stamps does not include a liner, or backing layer, protecting the pressure sensitive adhesive over its entire length. A piece of liner material 14 may be provided, however, at the center (i.e., the end) of coil 10 in order to inhibit lint, dirt, dust and the like from adhering to the stamps at the center of the coil, thereby preventing a sure adhesion of those stamps to the envelope at the time of use, and in order to meet security requirements imposed by the United States Postal Service or any other issuer of the stamps. A piece of liner material 16 may also be provided at the outer portion (i.e., the beginning) of coil 10 in order to facilitate removal of the first stamp or first few stamps from the strip 12 of stamps. However, it should be noted that as the strip 12 of stamps may be several yards, or more, in length the sections of the strip 12 which include a liner layer are relatively very small.

While the coil 10 of stamps shown in FIG. 1 is desirable in that it does not include a liner over the entire strip of stamps comprising the coil, the production of coil 10 introduces new problems of its own. More specifically, known methods for manufacturing stamps, even coils of stamps, cannot be used to create a coil of stamps which does not include a liner over the entire strip of stamps. The specific problems encountered using known methods for the production of coils of stamps which include a liner over the entire strip of stamps, and the novel solutions to those problems which comprise the present invention, are discussed in detail below.

What is desired, therefore, is a system and method of creating a coil of stamps, which coil does not require a liner layer over the entire strip of stamps comprising the coil, and which avoids the problems associated with known methods for the production of coils of stamps which include a liner over the entire strip of stamps.

SUMMARY OF THE INVENTION

Accordingly, it is an object of the present invention to provide a system and method of creating a coil of stamps.

A more specific object of the present invention is to provide a system and method of creating a coil of stamps, which coil does not require a liner layer over the entire strip of stamps comprising the coil.

A further object of the present invention is to provide a system and method having the above characteristics and which avoids the problems associated with known methods for the production of coils of stamps which include a liner over the entire strip of stamps.

These and other objects of the present invention are achieved by provision of a system for creating a coil of stamps from a web of stamp material having an adhesive applied to a side thereof. The system includes a substantially cylindrical anvil and a perforation die cooperating therewith with the web of stamp material passing therebetween in order to perforate the web of stamp material. The web of stamp material is passed between the anvil and the perforation die with the side of the web of stamp material having the adhesive applied thereto facing the anvil. The anvil is chilled so as to inhibit the adhesive applied to the web of stamp material from adhering thereto as the web of stamp material is perforated by cooperation of the perforation die and the anvil.

The anvil may be chilled from an outer surface thereof, or may be hollow and chilled from an inner surface thereof. In the former case, the system preferably includes a trough holding a chilling material through which at least a portion of an outer surface of the anvil is passed in order to chill the outer surface thereof. Most preferably, the chilling material comprises dry ice. Where the anvil is chilled from an inner surface thereof, a cooling fluid is preferably passed therethrough.

The system preferably also includes a liner application mechanism for applying a liner material to no more than a portion of the web of stamp material. Most preferably, the liner application mechanism includes a spool of liner material and a cutting mechanism for cuffing the liner material into a plurality of discrete pieces of liner material having a predetermined length before the liner material is applied to the side of the web of stamp material having the adhesive applied thereto. Preferably, each of the plurality of discrete pieces of liner material includes at least one perforation, and the at least one perforation is aligned with a perforation in the web of stamp material. It is also preferable that the liner application mechanism be located after the anvil and the perforation die.

In addition, the system preferably also includes a coiling mechanism for creating discrete coils of stamps from the web of stamp material. Most preferably, the coiling mechanism includes at least one roller around which the web of stamp material is wound in order to place the web of stamp material in tension and a bursting blade extending across a width of the web of stamp material. The bursting blade includes a narrow tip and is movable substantially perpendicular to the web of stamp material such that when moved fully toward the web of stamp material, the bursting blade breaks a plane formed by the web of stamp material. The bursting blade is moved forcefully toward the web of stamp material adjacent to a perforation in the web of stamp material in order to burst the perforation and separate a coil of stamps from the remainder of the web of stamp material. Most preferably, the narrow tip of the bursting blade has a shape selected from a group consisting of sharp, rounded, serrated, or straight shapes or combinations of these.

The invention and its particular features and advantages will become more apparent from the following detailed description considered with reference to the accompanying drawings.

DETAILED DESCRIPTION OF THE INVENTION

Figure 2:
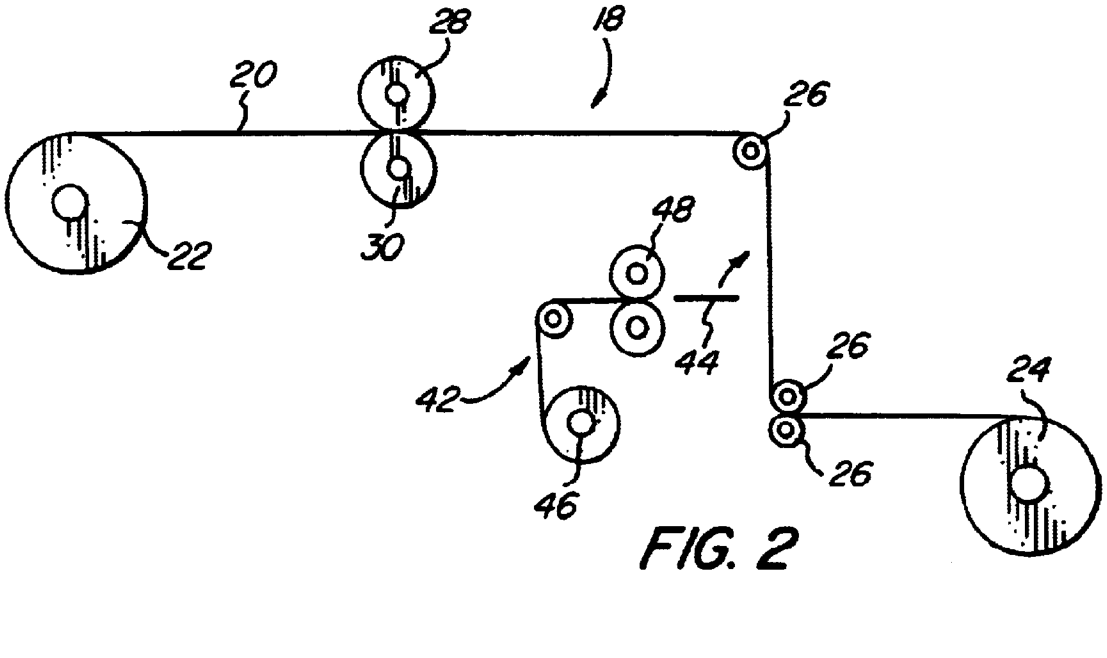
FIG. 2 is a schematic side view of a system for creating a coil of stamps, which coil does not require a liner layer over the entire strip of stamps comprising the coil, in accordance with the present invention.
Figure 3:
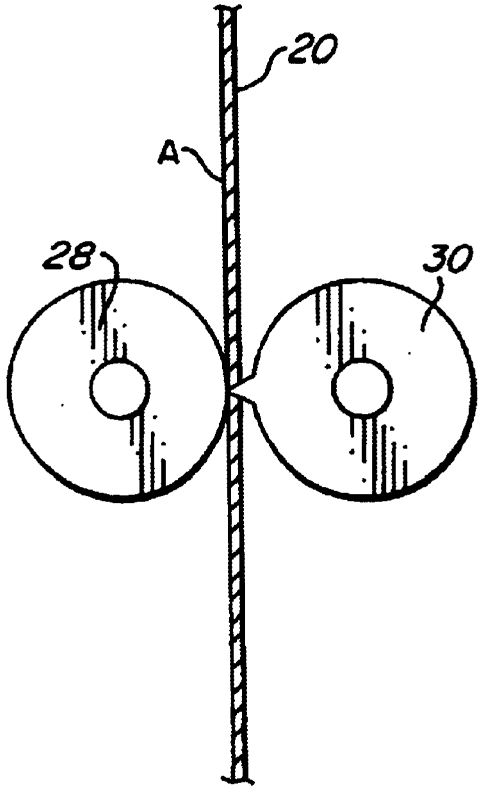
FIG. 3 is a schematic side view showing in greater detail a cooperating die and anvil for use in the system of FIG. 2.

Referring now to FIG. 2, an overall system 18 for creating a coil of stamps, which coil does not require a liner layer over the entire strip of stamps comprising the coil, in accordance with the present invention is shown. A web of contiguous strips of stamps 20 is wound around an input spool 22 and an output spool 24. Various rollers 26 are provided throughout system 18 in order to direct the web of stamps 20 to the proper positions. It should be noted that the web of stamps 20 has already been printed, and a pressure sensitive adhesive has already been applied to one side thereof.

Figure 6:
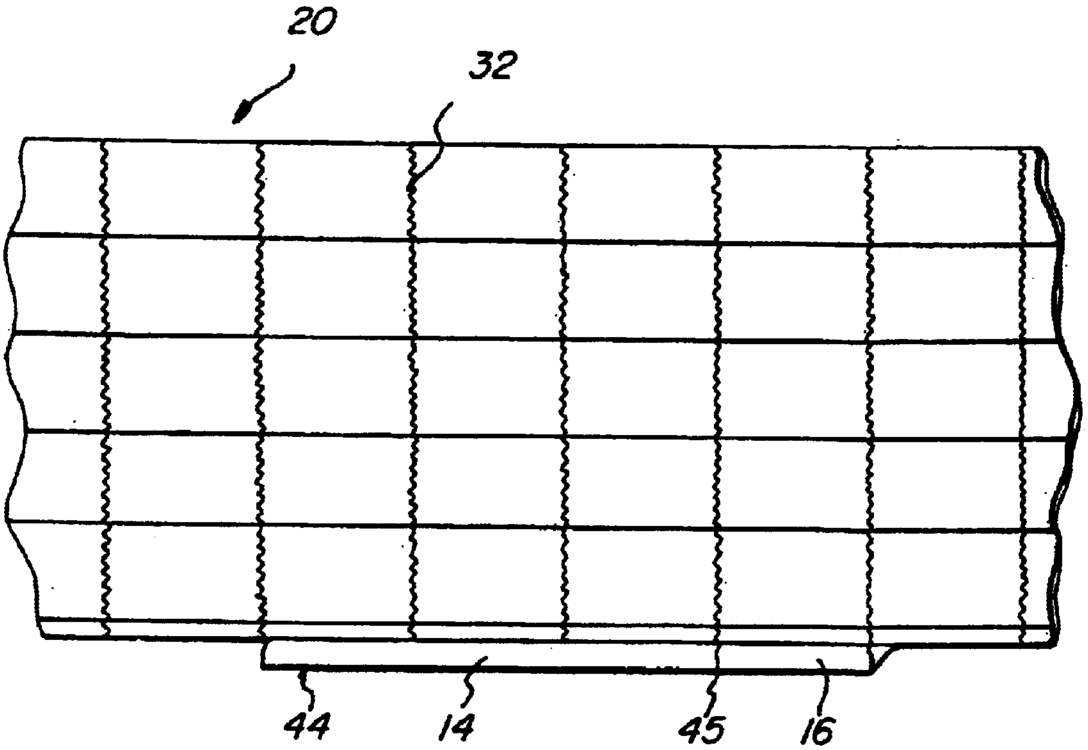
FIG. 6 is a top isometric view illustrating a section of a web of contiguous strips of stamps having a liner applied only to a portion thereof.

The web of stamps 20 is fed through a cooperating anvil 28 and die 30, which are provided in order to create perforations 32 in web 20 (see FIG. 6). Die 30 essentially comprises a cylindrical drum 34 having a plurality of protrusions 36 shaped so as to form perforations. As die 30 is essentially known in the art, it is not described in further detail herein.

Die 30 is pressed against cylindrical anvil 28 with great force with web of stamps 20 passing therebetween in order to create perforations 32 in web 20. While such a general process is known, the process had heretofore been used only to create perforations in materials not having a pressure sensitive adhesive applied thereto, or if so applied, having a protective backing or liner. As in the present case web of stamps 20 has a pressure sensitive adhesive applied thereto, and does not have a protective liner, special and unforeseen problems may arise.

Figure 5:
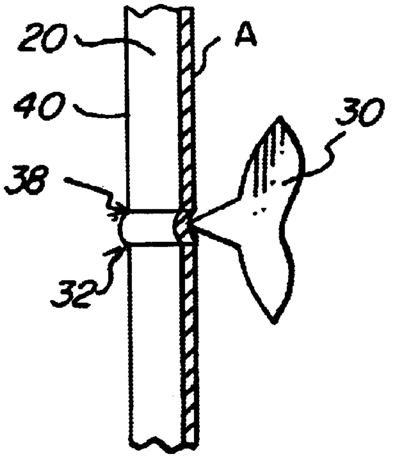
FIG. 5 is a side schematic view illustrating problems associated with known prior art stamp creating systems.
Figure 4:
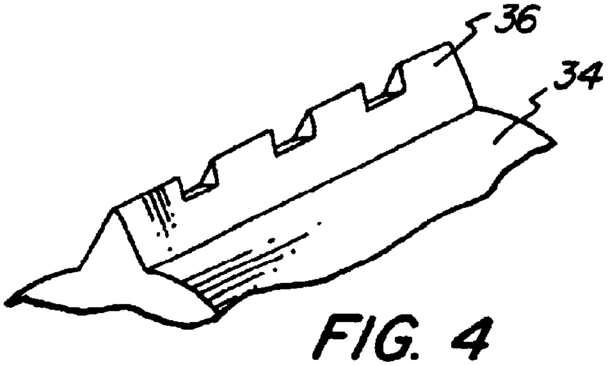
FIG. 4 is a partial side isometric view of the die of FIG. 3.

If web of stamps 20 is passed through anvil 28 and die 30 with the adhesive layer A facing the die 30, as is shown in FIG. 5, when perforations 32 are created, tiny bits of paper and even pieces of adhesive 38 may be forced under pressure to the front surface 40 of web of stamps 20. This is undesirable, as front surface 40 is specially coated with a material, typically silicone, to protect and inhibit the front side of web of stamps 20 from adhering to the back side thereof when web 20 is rolled onto itself. When tiny bits of paper and/or pieces of adhesive 38 are forced under pressure to the front surface 40 (i.e., past the protective silicone layer) of web of stamps 20, the benefits of the protective silicone layer in these areas are destroyed, and the web 20 may undesirably indeed stick to itself when rewound into a roll.

It has also been found that when the adhesive layer A is provided on the web of stamps 20 facing anvil 28, the adhesive A may undesirably adhere to anvil 28. It has been suggested that this problem may be avoided by providing the surface of anvil 28 with a protective coat of some type of oil or other lubricant. However, when such coating is provided, it has been found that this coating can contaminate adhesive A, thereby disadvantageously affecting its adhesive characteristics.

Therefore, in accordance with one novel aspect of the present invention, the outer surface of anvil 28 is chilled to a temperature well below standard room temperature. The exact temperature to which anvil 28 is chilled is dependent on the characteristics of adhesive A. The outer surface of anvil 28 may be chilled from the outside, such as by providing ice, dry ice or the like in a trough which contacts the outer surface, or by chilling the outer surface from the inside, such as by flowing a cool liquid through anvil 28. By so chilling the outer surface of anvil 28, adhesive A is inhibited from adhering thereto. This may be caused by the adhesive A in contact with the outer surface of the chilled anvil 28 essentially becoming inert at the contact point therewith, and may also be caused by a thin layer of moisture condensate being created by the chilled anvil on its outer surface.

Figure 1:
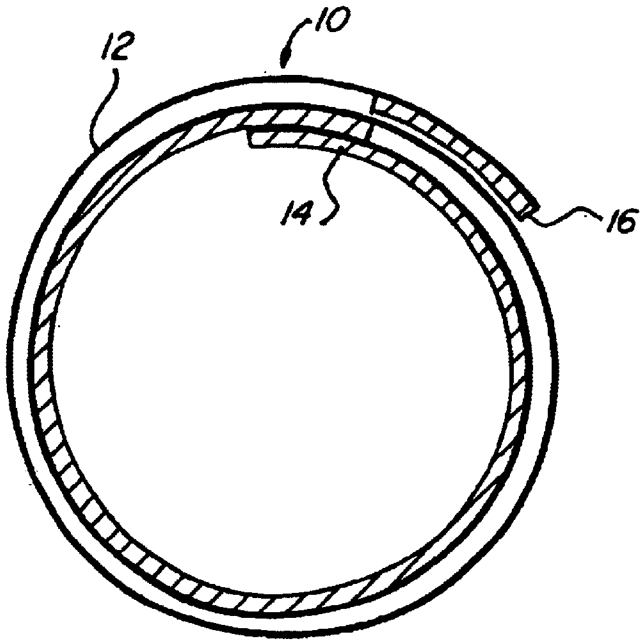
FIG. 1 is a side view of a coil of linerless pressure sensitive adhesive stamps which can be created by a system in accordance with the present invention.

Web of stamps 20 is also fed past a mechanism 42 by which a small amount of liner material 44 may be affixed thereto. Liner material 44 is provided on a spool 46, and is passed through a cutting device 48 which cuts liner material into appropriate sized pieces. It should be noted that the web of stamps 20 does not include a liner over its entire length. As discussed above, and in reference to FIG. 1, a piece of liner material 14 may be provided at the center (i.e., the end) of coil 10 and another piece of liner material 16 may be provided at the outer portion (i.e., the beginning) of coil 10.

It should be appreciated that the length of the piece of liner material 44 is the sum of the lengths of the pieces of liner material 14, 16. For purposes of illustration, and not limitation, and as illustrated in FIG. 6, piece of liner material 14 may be three stamps in length, while piece of liner material 16 may be one stamp in length. Piece of liner material 44 would thus be four stamps in length. It should be noted that liner material 44 includes a perforation 45 between pieces of liner material 14, 16, and that such perforation is precisely aligned so as to be proximate to a perforation 32 in web 20. Piece of liner material 14 may or may not include perforations therein.

Mechanism 42 may be provided either after anvil 28 and die 30 (as shown in FIG. 2) or therebefore. The former is preferable so as to reduce wear on die 30 by not requiring it to form perforations through web 20 and liner material 44. Moreover, as it is preferable that liner material 14 not include perforations therein, it is preferable that mechanism 42 be provided after anvil 28 and die 30.

Figure 7:
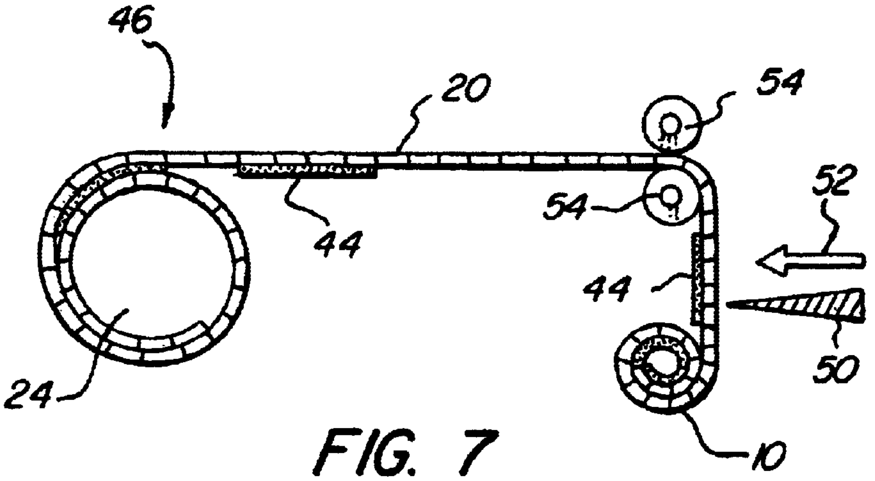
FIG. 7 is a side schematic view of a portion of the system for creating a coil of stamps, which coil does not require a liner layer over the entire strip of stamps comprising the coil, in accordance with the present invention.

Referring now to FIG. 7, a mechanism 46 is shown for creating discrete coils of stamps 10 from web of stamps 20. Web 20 may be fed to mechanism 46 directly from mechanism 18 (shown in FIG. 2), or as shown in FIG. 7, may first be wound into roll 24, and then later fed to mechanism 46. Web 20 is wound into coil 10, and may be passed around rollers 54, such that web 20 is in moderate tension, and a bursting blade 50 is provided proximate to coil 10. Bursting blade 50 extends across the entire width of web 20, and has a narrow tip which may be sharp or rounded, and serrated or straight. Bursting blade is movable substantially perpendicular to web 20 (indicated by arrow 52) and when moved fully toward web 20, breaks a plane formed thereby. Thus, after an appropriate number of stamps have passed by bursting blade 50, bursting blade 50 is moved forcefully toward web 20 at the appropriate time such that it strikes perforation 45 between pieces of liner material 14, 16, thereby bursting the perforation 45 and the perforation 32 to which it is adjacent, thereby separating coil 10 from the remainder of web 20. This break occurs precisely along the perforation 45 in the liner material 44, thereby severing the liner which is adhered to the web of stamps 20 in such a way as to create starting tab 16 on the finished coil 10 and inner liner 14 on the coil 10 which is about to begin.

The present invention, therefore, provides a system and method of creating a coil of stamps, which coil does not require a liner layer over the entire strip of stamps comprising the coil, and which avoids the problems associated with known methods for the production of coils of stamps which include a liner over the entire strip of stamps.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for creating a coil of stamps from a web of stamp material having an adhesive applied to a side thereof, said system comprising:

a substantially cylindrical anvil;

a perforation die cooperating with said anvil with the web of stamp material passing therebetween in order to perforate the web of stamp material;

wherein the web of stamp material is passed between said anvil and said perforation die with the side of the web of stamp material having the adhesive applied thereto facing said anvil;

wherein said anvil is chilled so as to inhibit the adhesive applied to the web of stamp material from adhering thereto as the web of stamp material is perforated by cooperation of said perforation die and said; and a liner application mechanism for applying a liner material to no more than a portion of the web of stamp material.

2. The system of claim 1 wherein said anvil is chilled from an outer surface thereof.

3. The system of claim 1 further comprising a trough holding a chilling material through which at least a portion of an outer surface of said anvil is passed in order to chill the outer surface of said anvil.

4. The system of claim 3 wherein the chilling material comprises dry ice.

5. The system of claim 1 wherein said anvil comprises a hollow substantially cylindrical anvil, and wherein said anvil is chilled from an inner surface thereof.

6. The system of claim 5 further comprising a cooling fluid passed through said hollow substantially cylindrical anvil in order to cool said hollow substantially cylindrical anvil.

7. The system of claim 1 wherein said liner application mechanism comprises:

a spool of liner material; and a cutting mechanism for cutting the liner material into a plurality of discrete pieces of liner material having a predetermined length before the liner material is applied to the side of the web of stamp material having the adhesive applied thereto.

8. The system of claim 7 wherein each of the plurality of discrete pieces of liner material includes at least one perforation, and wherein the at least one perforation is aligned with a perforation in the web of stamp material.

9. The system of claim 1 wherein said liner application mechanism is located after said anvil and said perforation die.

10. The system of claim 1 further comprising a coiling mechanism for creating discrete coils of stamps from the web of stamp material.

11. The system of claim 10 wherein said coiling mechanism comprises:

at least one roller around which the web of stamp material is wound in order to place the web of stamp material in tension;

a bursting blade extending across a width of the web of stamp material, said bursting blade having a narrow tip and being movable substantially perpendicular to the web of stamp material such that when moved fully toward the web of stamp material, said bursting blade breaks a plane formed by the web of stamp material; and wherein said bursting blade is moved forcefully toward the web of stamp material adjacent to a perforation in the web of stamp material in order to burst the perforation and separate a coil of stamps from the remainder of the web of stamp material.

12. The system of claim 11 wherein the narrow tip of said bursting blade has a shape selected from the group consisting of sharp, rounded, serrated, straight or combinations of these.

13. A system for creating a coil of stamps from a web of stamp material having an adhesive applied to a side thereof, said system comprising:

a substantially cylindrical anvil;

a perforation die cooperating with said anvil with the web of stamp material passing therebetween in order to perforate the web of stamp material;

wherein the web of stamp material is passed between said anvil and said perforation die with the side of the web of stamp material having the adhesive applied thereto facing said anvil;

wherein said anvil is chilled so as to inhibit the adhesive applied to the web of stamp material from adhering thereto as the web of stamp material is perforated by cooperation of said perforation die and said anvil;

a spool of liner material;

a cutting mechanism for cutting the liner material into a plurality of discrete pieces of liner material having a predetermined length;

an application mechanism for applying the pieces of liner material to the side of the web of stamp material having the adhesive applied thereto;

a bursting blade extending across a width of the web of stamp material, said bursting blade having a narrow tip and being movable substantially perpendicular to the web of stamp material such that when moved fully toward the web of stamp material, said bursting blade breaks a plane formed by the web of stamp material; and wherein said bursting blade is moved forcefully toward the web of stamp material adjacent to a perforation in the web of stamp material in order to burst the perforation and separate a coil of stamps from the remainder of the web of stamp material.

14. The system of claim 13 wherein said anvil is chilled from an outer surface thereof.

15. The system of claim 13 further comprising a trough holding a chilling material through which at least a portion of an outer surface of said anvil is passed in order to chill the outer surface of said anvil.

16. The system of claim 15 wherein the chilling material comprises dry ice.

17. The system of claim 13 wherein said anvil comprises a hollow substantially cylindrical anvil, and wherein said anvil is chilled from an inner surface thereof.

18. The system of claim 17 further comprising a cooling fluid passed through said hollow substantially cylindrical anvil in order to cool said hollow substantially cylindrical anvil.

19. The system of claim 13 wherein each of the plurality of discrete pieces of liner material includes at least one perforation, and wherein the at least one perforation is aligned with a perforation in the web of stamp material.

20. The system of claim 13 wherein the narrow tip of said bursting blade has a shape selected from the group consisting of sharp, rounded, serrated, straight or combinations of these.

21. A system for creating a coil of stamps from a web of stamp material having an adhesive applied to a side thereof, said system comprising:

a substantially cylindrical anvil;

a perforation die cooperating with said anvil with the web of stamp material passing therebetween in order to perforate the web of stamp material; and a liner application mechanism for applying a liner material to no more than a portion of the web of stamp material.

22. The system of claim 21 wherein said liner application mechanism comprises:

a spool of liner material; and a cutting mechanism for cutting the liner material into a plurality of discrete pieces of liner material having a predetermined length before the liner material is applied to the side of the web of stamp material having the adhesive applied thereto.

23. The system of claim 22 wherein each of the plurality of discrete pieces of liner material includes at least one perforation, and wherein the at least one perforation is aligned with a perforation in the web of stamp material.

24. The system of claim 21 wherein said liner application mechanism is located after said anvil and said perforation die.

25. The system of claim 21 wherein the web of stamp material is passed between said anvil and said perforation die with the side of the web of stamp material having the adhesive applied thereto facing said anvil, and wherein said anvil is chilled so as to inhibit the adhesive applied to the web of stamp material from adhering thereto as the web of stamp material is perforated by cooperation of said perforation die and said anvil.

26. The system of claim 25 wherein said anvil is chilled from an outer surface thereof.

27. The system of claim 25 further comprising a trough holding a chilling material through which at least a portion of an outer surface of said anvil is passed in order to chill the outer surface of said anvil.

28. The system of claim 27 wherein the chilling material comprises dry ice.

29. The system of claim 25 wherein said anvil comprises a hollow substantially cylindrical anvil, and wherein said anvil is chilled from an inner surface thereof.

30. The system of claim 29 further comprising a cooling fluid passed through said hollow substantially cylindrical anvil in order to cool said hollow substantially cylindrical anvil.

31. The system of claim 21 further comprising a coiling mechanism for creating discrete coils of stamps from the web of stamp material.

32. The system of claim 31, wherein said coiling mechanism comprises:

at least one roller around which the web of stamp material is wound in order to place the web of stamp material in tension;

a bursting blade extending across a width of the web of stamp material, said bursting blade having a narrow tip and being movable substantially perpendicular to the web of stamp material such that when moved fully toward the web of stamp material, said bursting blade breaks a plane formed by the web of stamp material; and wherein said bursting blade is moved forcefully toward the web of stamp material adjacent to a perforation in the web of stamp material in order to burst the perforation and separate a coil of stamps from the remainder of the web of stamp material.

33. The system of claim 32 wherein the narrow tip of said bursting blade has a shape selected from the group consisting of sharp, rounded, serrated, straight or combinations of these.

* * * * *